Nov. 23, 1965    J. B. FAIN    3,218,909
OPTICAL RANGING DEVICE USING MOVABLE CONCENTRIC
COPLANAR DETECTORS
Filed Dec. 22, 1961

POSITION II

POSITION I

INVENTOR.
JANICE B. FAIN
BY
ATTORNEYS

United States Patent Office 3,218,909
Patented Nov. 23, 1965

3,218,909
OPTICAL RANGING DEVICE USING MOVABLE CONCENTRIC COPLANAR DETECTORS
Janice B. Fain, The Hague, Netherlands, assignor, by mesne assignments, to the United States of America as represented by the Secretary of the Navy
Filed Dec. 22, 1961, Ser. No. 161,753
5 Claims. (Cl. 88—1)

The present invention relates to an optical range finder and more particularly to an arrangement of optical detectors to determine an image plane of an object so that the range to the object can be found by applying a lens equation.

It is well-known that the range to an object can be found by locating the image plane of rays of energy from the object after they have passed through a lens. By knowing the focal length of the lens and the distance from the lens to the image plane, the range from the lens to the object can be found according to the lens equation $$\frac{1}{f} = \frac{1}{u} + \frac{1}{v}$$

where $f$ is the focal length of the lens, $u$ is the distance of the object from the lens and $v$ is the distance of the image from the lens. In the past the method of finding the range to an object by locating the focal image thereof has presented problems in accuracy, these problems being due to the fact that the image plane could not be located accurately. The present invention has overcome this problem by providing a simple arrangement which will accurately determine the image plane thereby allowing a more precise ranging to a desired object. In a preferred embodiment of the invention there are provided two concentric infrared detectors lying in a common plane which is normal to the optical axis of the lens, one of the detectors being circular in shape and the other being an annular ring around and insulated from the first detector. The inner detector is located along the optical axis so that as the detectors are moved along the optical axis the ratio of the outputs of the detectors will indicate, upon a comparison, where the image plane of the desired object is located so that the range to the object can be determined by applying the equation set forth above.

An object of the present invention is to provide a device employing a lens which will more accurately determine the image plane of rays of energy focused by said lens.

Another object is to provide an arrangement of detectors which will accurately determine the location of an image plane of rays of energy focused by a lens.

A further object is to provide a simple and inexpensive device which will efficiently determine the location of an image plane of rays of energy from an object, the rays being focused by a lens.

Other objects and many of the attendant advantages of the invention will become readily apparent as the disclosure is made in the following detailed description of a preferred embodiment of the invention as illustrated in the accompanying sheet of drawings in which.

Figure 1:
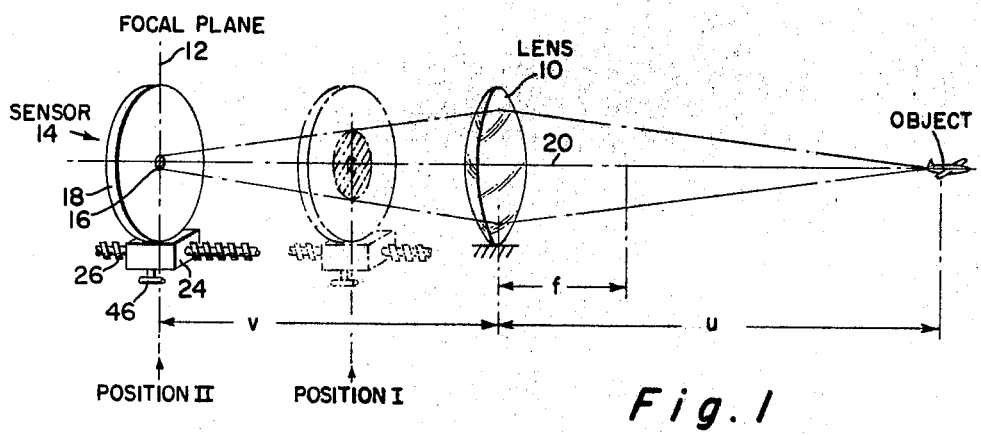
FIG. 1 is a perspective diagrammatic view of a preferred embodiment of the invention.

Referring now to the sheet of drawings wherein like reference numerals designate like or corresponding parts throughout the several views, there is shown in FIG. 1 an object such as a jet-type aircraft emanating energy such as thermal radiation which is focused by a lens 10 to an image plane 12. Interposed on a focusing side of the lens is a sensor 14 having an inner circular infrared detector 16 and an outer annular ring-shaped infrared detector 18, the outer detector being concentric with the inner detector and the two detectors having their responsive surfaces lying in a common plane. The inner circular detector 16 is positioned so that its center is intersected by an optical axis 20 and both detectors are further positioned with said common plane normal to the optical axis.

Figure 2:
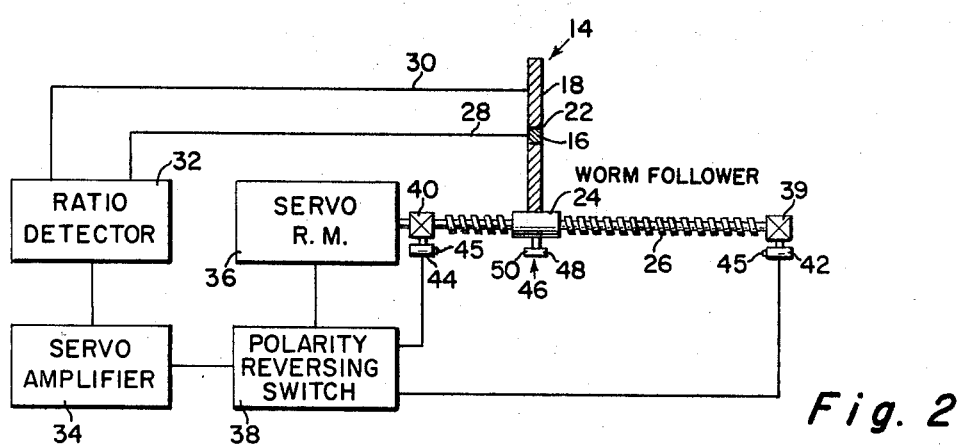
FIG. 2 is a diagrammatic view of the invention with corresponding electrical circuitry to automatically locate the image plane.

Referring now to FIG. 2 the sensor 14 is shown in cross section and an insulative material 22 is shown disposed between the inner detector 16 and the outer detector 18 so as to make each detector a separate responsive element. The sensor 14 is mounted on a worm follower 24, the worm follower in turn engaging a longitudinal worm 26 which is axially parallel to the optical axis 20. Accordingly, as the worm follower 24 travels along the worm 26 the inner circular detector 16 will travel with its center continuously traversing the optical axis 20.

The detectors 16 and 18, upon receiving rays of energy from the lens, each have an output which is fed via a lead 28 and a lead 30 respectively to a ratio detector 32, the ratio detector having an output which is inversely proportional to the ratio of the signal of the inner detector 16 to the outer detector 18. The output of the ratio detector is amplified by a servo amplifier 34 and the output of the servo amplifier is fed to a reversible servo 36 via a polarity reversing switch 38.

The ends of the worm 26 are journaled into bearings 39 and 40 and one of the ends is attached to the servo 36. Mounted on each of the bearings 39 and 40 are limit switches 42 and 44 respectively, each limit switch having a push button 45. Mounted on the worm follower 24 is a T-shaped actuator 46 which has arms 48 and 50 which are engageable with the push buttons of the limit switches 42 and 44 respectively. The limit switches 42 and 44 are connected to the polarity-reversing switch 38 so that when either limiting switch 42 or 44 is actuated the output of the servo amplifier 34 will be reversed prior to being fed into the servo 36.

Figure 4:
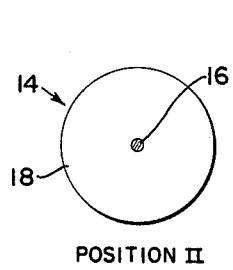
FIG. 4 is a diagrammatic view of the concentric detectors when they are located in position 2 as shown in FIG. 1.
Figure 3:
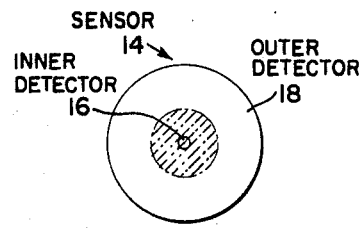
FIG. 3 is a diagrammatic view of the concentric detectors when they are located in position 1 as shown in FIG. 1.

The principle of the invention can be understood by reference to FIGS. 3 and 4 in connection with FIG. 1. FIG. 3 illustrates the position of the sensor 14 when it is located other than at the image plane and FIG. 4 illustrates the sensor when it is positioned at the image plane. As illustrated in FIG. 4, for optimum performance of the device, the inner circular detector 16 should have substantially the same area as the image of the object as it is shown at the image plane. Accordingly, when the sensor is located at position 1 the rays of energy are impinged upon both detectors 16 and 18 so as to give a finite ratio of the output of the detector 16 with respect to the detector 18. As the sensor is moved toward the image plane 12, this ratio increases rapidly until theoretically it reaches an infinite value when the sensor is located exactly at the image plane 12 as shown by position 2. Referring to FIG. 1, $f$ equals the focal length of the lens, $v$ equals the distance between the lens and the image plane of the object and $u$ equals the range from the lens to the object. Since the focal length of the lens will be known and the distance between the lens and image plane is found by positioning the sensor 14, the range $u$ from the lens to the object can be found by solving the lens equation $$\frac{1}{f} = \frac{1}{u} + \frac{1}{v}$$

In the operation of the device, the lens 10 is positioned so as to receive rays of energy from the object and focus them to an image plane. The sensor 14 is then positioned either by hand or automatically as shown in FIG. 2 to a location where the ratio of the inner detector 16 to the outer detector 18 is at a maximum. In the automatic operation the outputs of the detectors 16 and 18 are evaluated in the ratio detector 32, this output serving to operate a servomotor 36 which in turn rotates the worm 26 to position the sensor at the image plane. Assuming that the sensor is not on the image plane, the servo amplifier 34 will drive the servomotor 36 so as to move the sensor 14 either to the right or the left as shown in FIG. 2. Further assuming that the drive is initially in the wrong direction, that is, away from the image plane, the worm follower will travel to the end of the worm whereupon one of the ends 48 or 50 of the actuator 46 will contact one of the push buttons of the limit switches 42 or 44. Upon switching one of the limit switches 42 or 44 the polarity reversing switch 38 will cause the polarity of the output of the servo amplifier 34 to be reversed so as to reverse the servomotor and rotate the worm 26 in an opposite direction, thus then driving the sensor toward the image plane. As the sensor starts toward the image plane the ratio of the output of the inner detector 16 to the outer detector 18 will become increasingly large until it reaches a maximum at the image plane. When this ratio reaches a maximum, for all intents and purposes, the output of the ratio detector 32 is nil so that the sensor retains its position until such time that there is a change of range between the lens 10 and the object.

While the preferred embodiment is shown in FIG. 2 it is to be understood that the image plane could be found by manually positioning the sensor at a position where the ratio of the output of the detector 16 to the output of the detector 18 is at a maximum, the ratio being determined by reading values on an elecrical voltmeter attached respectively to each of the detectors. Also, it is to be noted that while the ratio between the detectors 16 and 18 has been selected as the inner detector 16 with respect to the outer detector 18 it is to be understood that the ratio could be reversed so as to determine the ratio of the output of the detector 18 with respect to the detector 16. If this latter ratio were chosen in lieu of the ratio used in the preferred embodiment, then the ratio detector would work in reverse also, namely: it would have an output which is directly proportional to this ratio so that when the ratio between the outer detector 18 with respect to the inner detector 16 increases the output of the ratio detector 32 would likewise increase.

While any lens which focuses rays of energy from an object to an image plane would be suitable for operation in the device, it is preferred that the lens be relatively thin. Further, the detectors 16 and 18 need not necessarily be located in the same plane. The detectors may be disposed from one another along the optical axis 20 and may even overlap one another and still give an operable device just so long as the inner detector 16 is located on the optical axis and is at all times positioned to receive rays of energy focused by the lens 10.

Obviously many modifications and variations of the present invention are possible in light of the above teachings. It is therefore to be understood that within the scope of the appended claims the invention may be practiced otherwise than as specifically described.

I claim:

1. A range finder for determining the range to an object which emanates rays of energy comprising a stationary lens for focusing the rays of energy from the object to an image plane, said lens having an optical axis and a focal length, a first detector and a second detector, means for positioning the first detector so that it traverses the optical axis and for positioning the first and second detectors with respect to one another so that they will be capable of being simultaneously responsive to a separate bundle of rays, each detector having an output proportional to the amount of ray energy respectively received thereby, and means for spacing the detectors from the lens along the axis whereby upon spacing the detectors and the lens such that the ratio of the output of the first detector to the output of the second detector is at a maximum the range from the lens to the object can be found by applying the formula $$\frac{1}{f} = \frac{1}{u} + \frac{1}{v}$$

where $f$ is the focal length of the lens, $u$ is the range from the lens to the object and $v$ is the distance from the image plane to the lens.

2. A range finder as claimed in claim 1 wherein each detector has a responsive area, each responsive area being mutually exclusive from the other responsive area.

3. A range finder for determining the range to an object which emanates rays of energy comprising a stationary lens for focusing the rays of energy from the object to an image plane, said lens having an optical axis and a focal length, a first detector and a second detector, each detector having a surface responsive to the rays of energy and each having an output proportional to the amount of energy received, means for mounting the responsive surface of the second detector in a substantially adjoining fixed relationship with respect to the responsive surface of the first detector so that each detector is adapted to be responsive to a separate bundle of rays, said means also for mounting the detectors on a focusing side of the lens with the responsive surface of the first detector traversing the optical axis so that the first detector will be capable of receiving a bundle of rays in the vicinity of the axis and the second detector will be capable of receiving another bundle of rays offset from said axis, and said means also for allowing the detectors to be spaced at varying distances from the lens along the axis whereby upon spacing the lens and the detectors such that the ratio of the output of the first detector to the output of the second detector is at a maximum the range from the lens to the object can be found by applying the formula $$\frac{1}{f} = \frac{1}{u} + \frac{1}{v}$$

where $f$ is the focal length of the lens, $u$ is the range from the lens to the object and $v$ is the distance from the image plane to the lens.

4. A range finder as claimed in claim 1 wherein said means further mounts the first and second detectors in a concentric coplanar relationship with respect to one another.

5. An infrared range finder for determining the range to an object which emits rays of infrared energy comprising: a thin lens having a focal length and an optical axis, the lens being capable of focusing rays of infrared energy to an image at an image plane; an inner infrared detector and an outer infrared detector each of which has a substantially planar surface responsive to rays of infrared energy and each having an output signal proportional to the amount of infrared energy received thereby; the responsive surface of the inner detector being circular in shape with an area substantially equal to the area of said image at the image plane; the responsive surface of the outer detector being annular in shape with a circular opening of a size substantially equal to the responsive surface of the inner detector; means for mounting the responsive surface of the inner detector within the opening of the responsive surface of the outer detector so that the surfaces are in a concentric relationship with respect to one another with each surface substantially in the same plane; the responsive surfaces in their concentric relationship each being capable of being responsive to a separate bundle of rays; means movable along said optical axis for mounting the detectors with their responsive surfaces normal to the axis, with the axis passing through the center of the responsive surface of the inner detector and with the responsive surfaces facing the lens whereby upon the lens receiving rays of energy from the target the image plane can be found by moving the detectors along the axis until the ratio of the signal of the inner detector to the signal of the outer detector is at a maximum, the location of the image plane enabling a determination of the range from the lens to the object by applying the formula $$\frac{1}{f}=\frac{1}{u}+\frac{1}{v}$$

where $f$ is the focal length of the lens, $u$ is the range from the lens to the object and $v$ is the distance from the image plane to the lens.

References Cited by the Examiner
UNITED STATES PATENTS

| | | |
|---|---|---|
| 2,134,757 | 11/1938 | Goldsmith. |
| 2,999,436 | 9/1961 | Faulhaber _____ 88—1 X |
| 3,017,515 | 1/1962 | Welch _____ 88—1 X |
| 3,041,459 | 6/1962 | Greene. |
| 3,054,898 | 9/1962 | Westover et al. |

FOREIGN PATENTS

| | | |
|---|---|---|
| 479,662 | 2/1938 | Great Britain. |

OTHER REFERENCES

"Optar," Electronics, April 1950, pp. 102 to 105.

JEWELL H. PEDERSEN, *Primary Examiner.*

FREDERICK M. STRADER, *Examiner.*